United States Statutory Invention Registration [19]

[11] Reg. Number: H640

Nizel [43] Published: Jun. 6, 1989

[54] INDUCTIVE SINTERING OF POLYMERS TO BLADES

[75] Inventor: Jonathan Nizel, Natick, Mass.

[73] Assignee: The Gillette Company, Boston

[21] Appl. No.: 188,423

[22] Filed: Apr. 29, 1988

[51] Int. Cl.[4] ..... B05D 3/02

[52] U.S. Cl. ..... 427/45.1; 427/47; 427/46; 427/388.1

[58] Field of Search ..... 427/45.1, 47, 346, 388.1

[56] References Cited

U.S. PATENT DOCUMENTS 3,224,900 12/1965 Creamer et al. ..... 427/46

*Primary Examiner*—John F. Terapane
*Assistant Examiner*—John M. Covert
*Attorney, Agent, or Firm*—Owen J. Meegan; Aubrey C. Brine; Scott R. Foster

[57] ABSTRACT

A method of manufacturing a razor blade is disclosed wherein a polymer material is coated onto the blade edge. The polymer material is applied to the blade edge in a coating solution after which the blade is passed through a rapidly changing magnetic field in close proximity to the blade, which induces a current to generate heat for sintering the material to the blade edge.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INDUCTIVE SINTERING OF POLYMERS TO BLADES

BACKGROUND OF THE INVENTION

The present invention relates to the manufacture of razor blades and more particularly to the manufacture of a razor blade having a coating of polymeric material disposed on the edge surfaces thereof.

In the prior art, it is known to manufacture razor blades having various coatings which have been developed to provide the blades with a protection against atmospheric conditions as well as contact with various materials during storage or the shaving process which materials would tend to degrade the basic material of the blade.

In addition to the protection of the stainless steel, or other material, from which the blade is manufactured, the various coating supplied to the blade edges have been formulated with an attempt to eliminate the undesirable effects which occur in the shaving process that may cause irritation to the skin of the blade user.

In order to accomplish the above, blades have been treated by the coating of a polymeric material to the surface of the blade cutting edge by means of a sintering process. Generally, the process of applying the polymer material to the razor blade is accomplished by application of the polymeric material, in solution, to the blade and heating the blade in an oxygen-free environment causing the polymeric material to become sintered to the blade edge surface. Heating of the blade to produce the sintering has, in general, been accomplished by infra-red or resistance heating of the blade to a temperature in a range of between 200° C. to 400° C. Various examples of such a process are disclosed in U.S. Pat. No. 3,224,900 issued to Creamer et al.

It is an object of the present invention to provide an improvement to the prior art process of applying a coating of polymeric material to the edge surfaces of a razor blade through the introduction of induction heating in the manufacturing process.

Another object of the invention is to improve polymer to blade bonding by reducing the potential for gross cross-linking of excess polymer material.

Still a further object of the invention is to reduce the energy requirements for sintering of the polymeric material to the blade edge surface by the use of inductive sintering.

SUMMARY OF THE INVENTION

The aforementioned objects and other objects which will become apparent as the description proceeds are accomplished by providing a method of manufacturing a razor blade having a coating of polymeric material disposed on the edge surfaces of the blade which includes the steps of providing a chamber having an oxygen-free atmosphere therein and a means with the chamber for creating a rapidly changing magnetic field. Polymeric material is applied to the edge surfaces of the blade and the blade is retained in the changing magnetic field whereby the current induced by the alternating magnetic field is effective to raise the temperature of the blade and cause sintering of the polymeric material to the blade edge surfaces. In a more detailed aspect of the invention, a method of manufacturing a razor blade having a coating of polymeric material disposed on the edge surfaces thereof includes the steps of providing a chamber having an oxygen-free atmosphere therein and an induction coil having an alternating current applied thereto to create a rapidly changing magnetic field of between 1 megahertz and 100 megahertz within the chamber. A polyethylene resin material is applied to the edge surfaces of the blade and the blade is retained in the changing magnetic field at a rate whereby the current induced by the magnetic field raises the temperature of the blade to between 200° C. to 400° C. to cause sintering of the material to the blade edge surfaces.

BRIEF DESCRIPTION OF THE DRAWING

The foregoing and other features of the invention will be more particularly described in connection with the preferred embodiment, and with reference to the accompanying drawing wherein.

DESCRIPTION OF THE PREFERRED EMBODIMENT

The preparation of the razor blades for coating in the present invention is similar to that employed in the prior art, in that the blades are first cleaned with a solvent or detergent to dissolve grease and dirt which may have accumulated on the blades, and to prepare a surface which is receptive to the coating to be affixed to the blade surface.

After washing the blades, they are dried and placed on a carrier-type device which may be of any type well known in the art, and are coated with the polymeric material such as a polyethylene resin. The resin may be applied in solution by spraying or brushing the material onto the blade surface in a manner to provide a substantially uniform coating on the blade surface.

Figure 1:
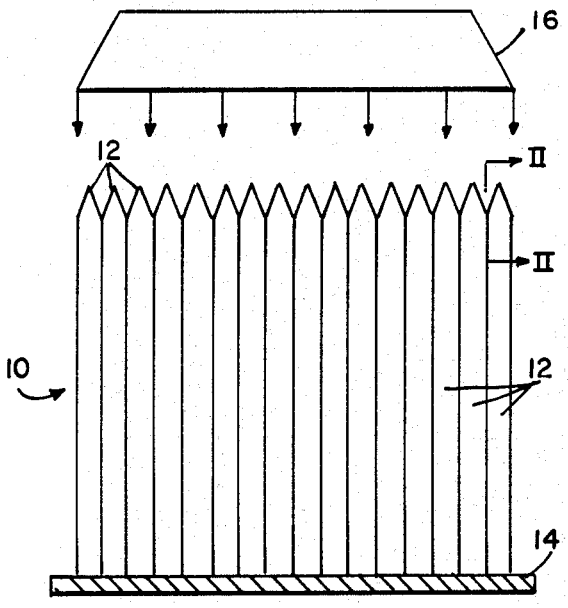
FIG. 1 PRIOR ART
FIG. 1 is a schematic elevational view depicting a step in a prior art process for the manufacture of razor blades having a polymer coating applied to the edge thereof.
Figure 2:
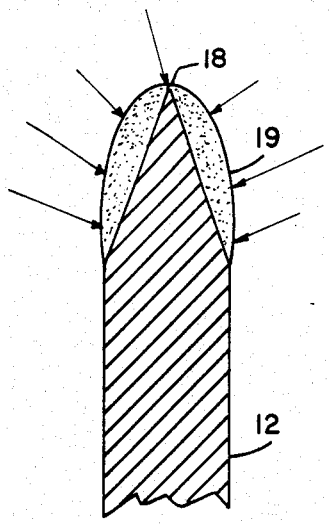
FIG. 2 PRIOR ART
FIG. 2 is a fragmentary elevational view taken in the area II—II showing a portion of the prior art blade of FIG. 1, taken on an enlarged scale for clarity.

Referring now to the drawings and in particular to FIGS. 1 and 2, the prior art method is shown wherein a blade stack 10 comprising a plurality of blades 12 are mounted on a retainer 14 and a coating of polymeric material is applied as described above. The blade stack 10 is then subjected to radiant heating from an infra-red heating source 16 for a length of time and at a heating intensity which is effective to raise the temperature to between 200° C. to 400° C. to cause sintering of the material to the blade surface.

Referring to FIG. 2, there is schematically shown the effect of external heating on the blade surface wherein the heat must pass through the polymeric material to heat blade surface. This results in blade edge 18 having little of the polymer material deposited on the surface due to its not retaining the heat from the heating source 16 in light of its relatively small cross-section and large surface area.

Figure 3:
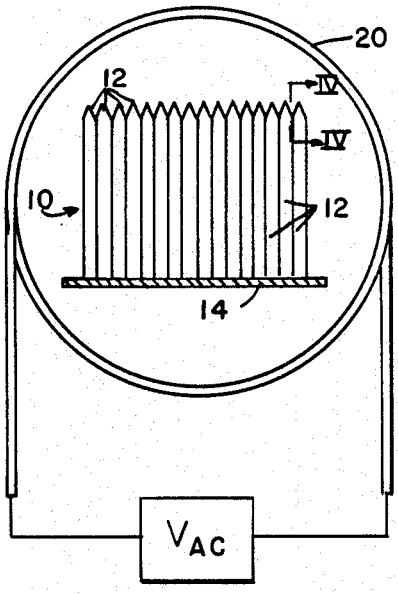
FIG. 3 is a schematic elevational view depicting one step in the process of the manufacture of a razor blade having a polymer coated edge, carried out in accordance with the teaching of the present invention.
Figure 4:
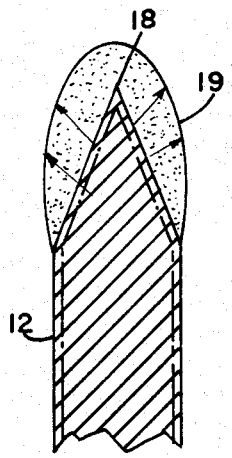
FIG. 4 is a fragmentary elevational view taken in the area IV—IV showing a portion of the blade of FIG. 4 taken on an enlarged scale for clarity.

Referring now to FIGS. 3 and 4, there is schematically shown a device for carrying out the method of the present invention. As in the prior art method depicted in FIGS. 1 and 2, the blade stack 10 having a plurality of blades 12 is supported by a retainer 14 for treatment in the present process. As with the prior art blades, the blades 12 are cleaned and a polymeric material in the form of a polyethylene resin is applied to the blades 12 which are supported by the retainer 14 for treatment.

An induction coil 20 is provided in a container from which the oxygen is removed by the introduction of a non oxygen containing gas and an alternating current is applied to the coil 20 to produce a frequency in the range of 1 megahertz to 100 megahertz at the blade stack 10. The high frequency causes sintering of the polymeric material to the blade surfaces including the blade edge as is shown in FIG. 4.

Referring now to FIG. 4, the inducing of an alternating current along the body of the blade 12 at frequencies high enough, are considered to result in a skin effect on the surface of the blade 12 as depicted by the dot-dash lines of FIG. 4. This skin effect produces the highest current densities, and therefore the highest heating, at the blade edge 18. Thus, the rapidly changing magnetic field in close proximity to the blades 12 will induce a current which will generate heat for sintering the blade edge 18, which being relatively small in cross-sectional area, will heat preferentially. The polymer material 19 is therefore more evenly bonded to the blade 12 and the potential for gross cross-linking of excess polymer is reduced. In addition, the amount of energy required for sintering for the polymer material to the blade 12 is reduced over that required by the use of infra-red heating.

I claim:

1. A method of manufacturing a razor blade having a coating of polymeric material disposed on the edge surface thereof which includes the steps of providing a chamber having an oxygen-free atmosphere therein and a means for creating a rapidly changing magnetic field within said chamber, applying a polymeric material to the edge surface of the blade, and retaining said blade in said magnetic field whereby the current induced by said magnetic field is effective to raise the temperature of said blade and to cause sintering of said polymeric material to said blade edge surfaces.

2. A method of manufacturing a razor blade as set forth in claim 1 wherein said means for creating a magnetic field comprises an induction coil having an alternating current applied thereto.

3. A method of manufacturing a razor blade as set forth in claim 1 wherein material is a polyethylene resin.

4. A method of manufacturing a razor blade as set forth in claim 1 wherein said material is raised to a temperature of 200° C. to 400° C.

5. A method of manufacturing a razor blade as set forth in claim 1 wherein the frequency of the magnetically induced current is between 1 megahertz and 100 megahertz.

6. A method of manufacturing a razor blade having a coating of polymeric material disposed on the edge surfaces thereof which includes the steps of providing a chamber having an oxygen-free atmosphere therein and an inductive coil having an alternating current applied thereto to create a rapidly changing magnetic field within said chamber, applying a polyethylene resin material to the edge surfaces of the blade and passing said blade through said magnetic field at a rate whereby the current induced by said magnetic field raises the temperature of said blade to between 200° C. to 400° C. to cause sintering of said material to said blade surfaces.

* * * * *